United States Patent [19]

Kruse et al.

[11] Patent Number: 5,249,636
[45] Date of Patent: Oct. 5, 1993

[54] PERSONAL MOBILITY VEHICLE

[75] Inventors: Thomas E. Kruse; John C. Traxler, both of Sarasota, Fla.

[73] Assignee: Sunstate Mobility Corporation, Sarasota, Fla.

[21] Appl. No.: 875,737

[22] Filed: Apr. 28, 1992

[51] Int. Cl.⁵ .............................................. B62D 61/00
[52] U.S. Cl. ..................................... 180/21; 180/214; 180/907; 293/127
[58] Field of Search ............... 180/21, 22, 24.06, 211, 180/213, 214, 6.44, 65.1, 907, 68.5, 65.5; 280/770, 304.1; 293/127

[56] References Cited

U.S. PATENT DOCUMENTS

| | | | |
|---|---|---|---|
| 2,222,835 | 11/1940 | Gambardella | 293/127 X |
| 2,482,203 | 9/1949 | Peterson et al. | 180/211 X |
| 2,586,273 | 2/1952 | Steven | 180/907 X |
| 2,644,540 | 7/1953 | Balzer | 180/211 |
| 3,110,352 | 11/1963 | McClarnon | 180/211 |
| 3,137,869 | 6/1964 | Johnson | 180/211 X |
| 3,566,986 | 3/1971 | Udden | 180/21 |
| 3,820,790 | 6/1974 | Peterson | 293/127 |
| 4,324,301 | 4/1982 | Eyerly | 293/127 X |
| 4,475,613 | 10/1984 | Walker | 180/22 |
| 4,666,008 | 5/1987 | Shepard et al. | 180/907 X |
| 5,036,938 | 8/1991 | Blount et al. | 180/68.5 X |
| 5,121,806 | 6/1992 | Johnson | 180/907 X |

Primary Examiner—Margaret A. Focarino
Assistant Examiner—Florian Zeender
Attorney, Agent, or Firm—Charles J. Prescott

[57] ABSTRACT

A personal mobility vehicle having a very low center of gravity and compact overall size which facilitates travel in narrow hallways and in negotiating sharp turns as into a doorway along a narrow hall. The vehicle includes a generally horizontally disposed preferably circular, disc-shaped frame supported in close proximity above the ground by a steerable, motor-driven rear wheel and two spaced front wheels. A battery arrangement is connected to and supported by the frame and operably connected between a control lever in electrical communication with an electronic circuit and the motors for propelling and steering the rear wheel. A seat is provided whereby a user's feet may be comfortably supported on the frame. A circular cushioning ring, either fixed or preferably rotatably mounted and extending radially from the perimeter of the frame, contacts fixed objects such as walls, doorways and the like to facilitate tight maneuvers not heretofore possible with other such vehicles. Outrigger type anti-scuff and anti-tip wheels may also be provided.

9 Claims, 4 Drawing Sheets

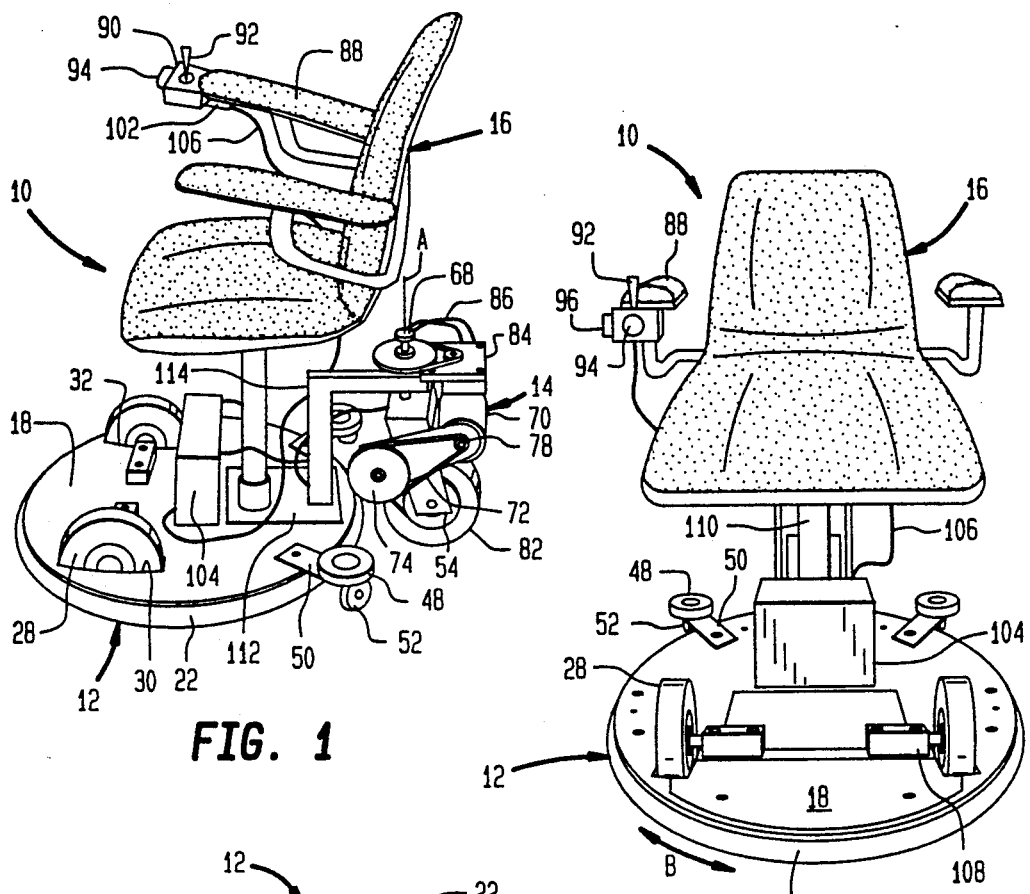
FIG. 1
FIG. 2
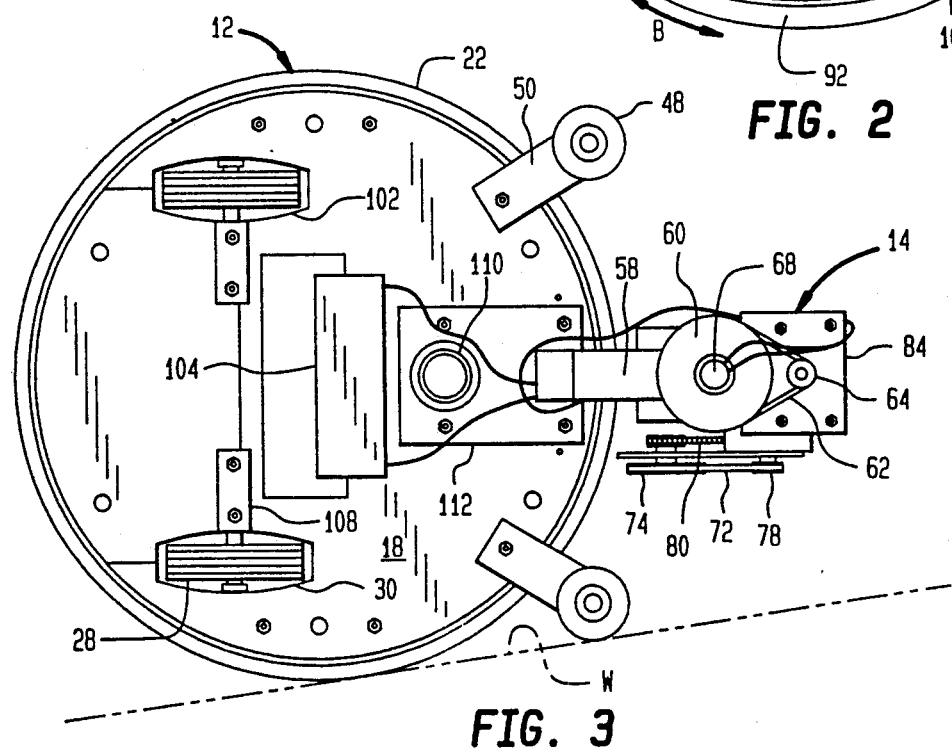
FIG. 3

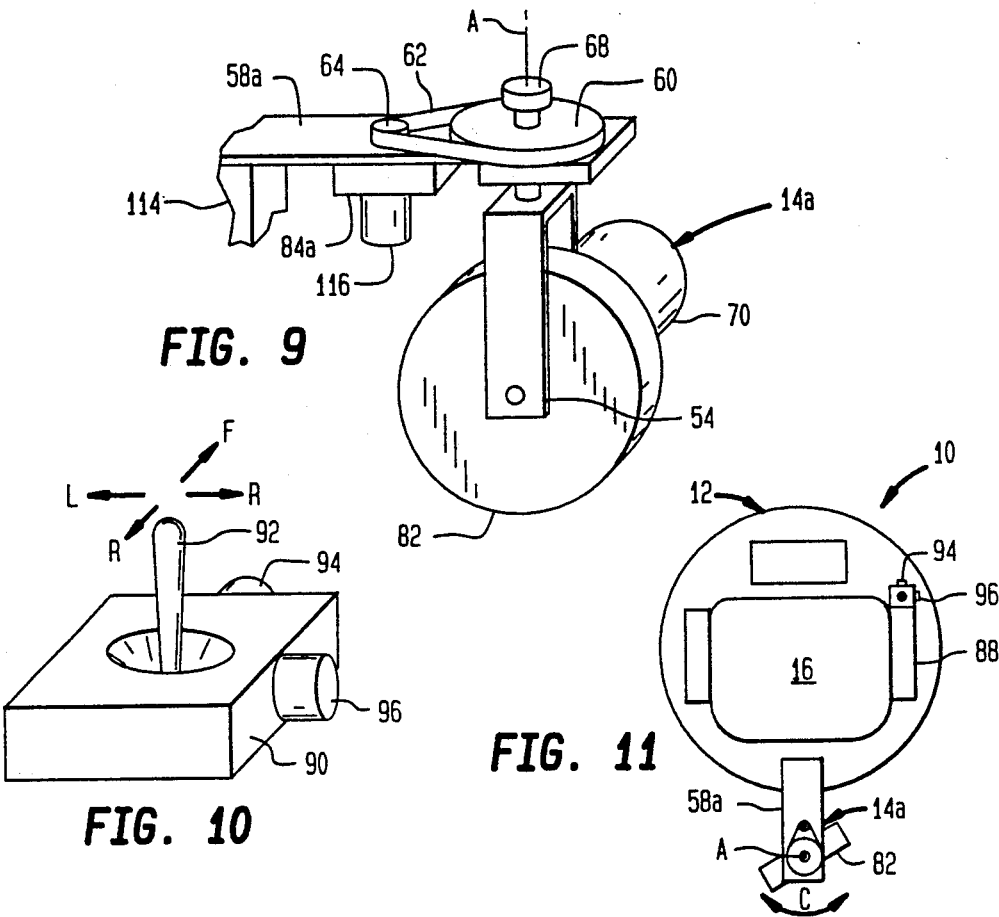
FIG. 9
FIG. 10
FIG. 11
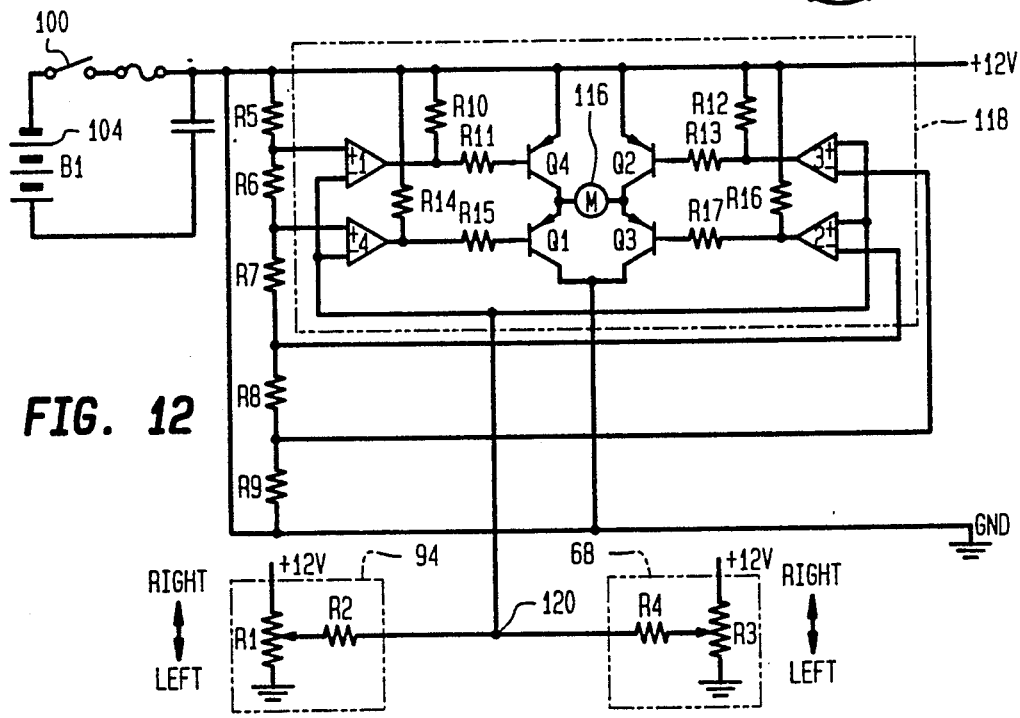
FIG. 12

PERSONAL MOBILITY VEHICLE

BACKGROUND OF THE INVENTION

This invention relates generally to self-propelled personal mobility vehicles for the handicapped and physically impaired, and more particularly to a compact, low center-of-gravity personal mobility vehicle which is uniquely adapted to negotiate within tightly confined spaces.

Presently, a broad array of self-propelled personal mobility vehicles for use by the handicapped and physically impaired are either patented and/or marketed. These vehicles are almost exclusively motorized and battery powered and consist of either three or four ground engaging wheels. However, the three wheeled tricycle-type version appears most popular. The drive arrangement may include a propulsion motor operably connected to either one or both of the rear drive wheels or incorporated into a front steerable wheel.

Typically, these available personal mobility vehicles are relatively massive in structure, some of which are also designed for outdoor operation in grass and dirt. Additionally, the center of gravity of the user seated atop such available vehicles is relatively high, producing a somewhat compromised stability.

In the typical front wheel steering vehicle, a steering tiller is incorporated to be manually operated by the rider. As a result, these vehicles are relatively long to accommodate the steering tiller and must be entered from the side to get behind the tiller. Such vehicles also prohibit driving up to and under a table due to the presence of the steering tiller in the front of the vehicle.

A further limitation of personal mobility vehicles presently known to applicant resides in the limited ability of these larger vehicles to negotiate narrow hallways, to avoid running over the toes of others nearby on foot, and to be able to maneuver in dimensionally tight environments such as through a doorway of a narrow hallway. For example, those individuals who live in mobile homes or the like having narrow hallways, typically approximately 24" in width, are unable to utilize any such product currently on the market for this environment.

The present invention provides an extremely maneuverable, low center of gravity personal mobility vehicle which, in the preferred embodiment, will easily maneuver down narrow hallways, through narrow doorways at 90 degrees to such hallway, and into other dimensionally tight situations. A unique electronically controlled rear steerable propelling wheel arrangement is also provided, thus eliminating the front tiller. This invention also reduces the likelihood of running over the foot of an able bodied pedestrian who may inadvertently get too close to the vehicle while underway.

BRIEF SUMMARY OF THE INVENTION

This invention is directed to a personal mobility vehicle having a very low center of gravity and compact overall size which facilitates travel in narrow hallways and in negotiating sharp turns as into a doorway along a narrow hall. The vehicle includes a generally horizontally disposed preferably circular, disc-shaped frame supported in close proximity above the ground by a steerable, motor-driven rear wheel and two spaced front wheels. A battery arrangement is connected to and supported by the frame and operably connected between a control lever which activates an electronic circuit and the motors for propelling and steering the rear wheel. A seat is provided whereby a user's feet may be comfortably supported on the frame. A circular cushioning ring, either fixed or preferably rotatably mounted and extending radially from the perimeter of the frame, contacts fixed objects such as walls, doorways and the like to facilitate tight maneuvers not heretofore possible with other such vehicles. Outrigger type anti-scuff and anti-tip wheels connected to the frame may also be provided.

It is therefore an object of this invention to provide a self-propelled personal mobility vehicle which is extremely compact in size and maneuverable in tight quarters.

It is another object of this invention to provide a personal mobility vehicle which provides easy frontal access to the seat area and also has a very low center of gravity.

It is another object of this invention to provide a personal mobility vehicle which will travel down narrow hallways such as are found in mobile homes and having a unique circular bumper or cushioned ring rotatable with respect to a circular frame so as to facilitate right angle turns through doorways from such narrow hallways.

It is yet another object of this invention to provide a personal mobility vehicle which reduces the likelihood of running over a pedestrian's foot.

And yet another object of this invention is to provide a personal mobility vehicle having a unique rear steerable propelling wheel which greatly enhances maneuverability and compactness.

In accordance with these and other objects which will become apparent hereinafter, the instant invention will now be described with reference to the accompanying drawings.

BRIEF DESCRIPTION OF THE DRAWINGS

FIG. 1 is a left side perspective view of the invention.

FIG. 2 is a front perspective view of FIG. 1.

FIG. 3 is a top perspective view of the invention shown in FIG. 1 with the seat removed for clarity.

FIG. 9 is a left side perspective schematic view similar to FIG. 4 except depicting an alternate positioning arrangement for the drive motors.

FIG. 10 is a perspective view of the Joystick-type single lever control of this invention.

FIG. 11 is a simplified top plan schematic view of the invention incorporating the alternate arrangement shown in FIG. 9.

FIG. 12 is a schematic diagram of the electronic control circuit for controlling the steering of this invention.

DETAILED DESCRIPTION OF THE INVENTION

Figure 4:
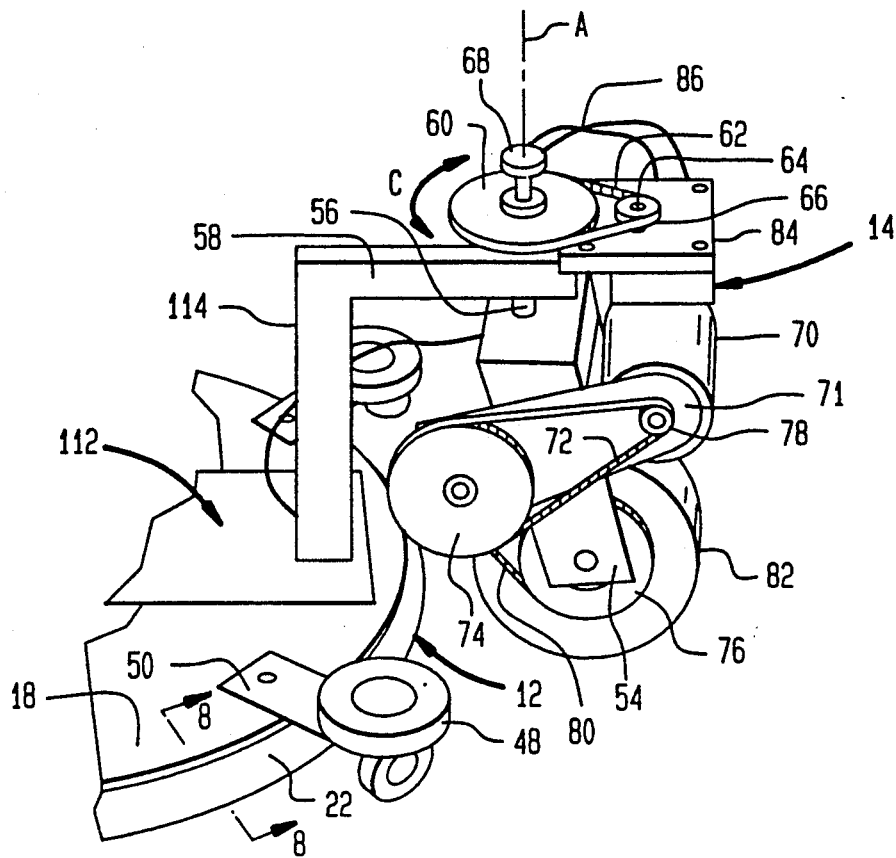
FIG. 4 is an enlarged left side perspective view of the rear steerable, motor driven wheel of the invention shown in FIG. 1.
Figure 5:
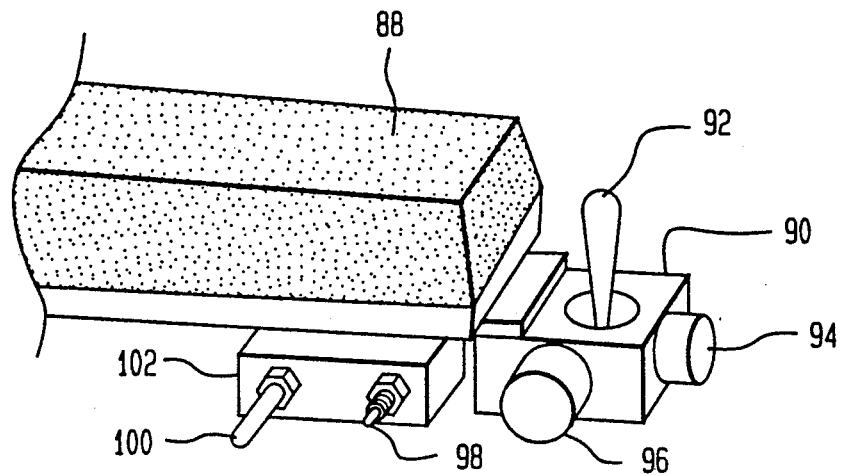
FIG. 5 is an enlarged right side perspective view of the right hand armrest and hand actuated control lever.

Referring now to the drawings, the invention is shown generally at numeral 10 and includes a frame assembly 12 and a motor driven steerable rear wheel assembly 14 which renders this rear wheel assembly 14 steerable about an upright axis A with respect to frame 12. The invention 10 also includes a seat assembly 16 rigidly mounted and upwardly extending from the disc-shaped circular frame assembly 12 as will be described herebelow.

Figure 6:
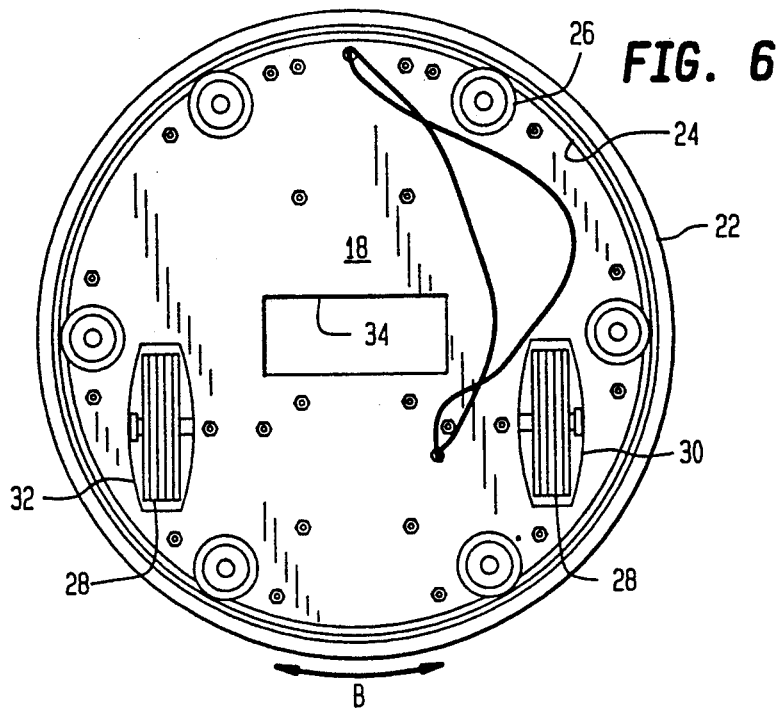
FIG. 6 is a bottom plan view of the frame shown in FIG. 1 after removal of the mating, spaced bottom plate.
Figure 7:
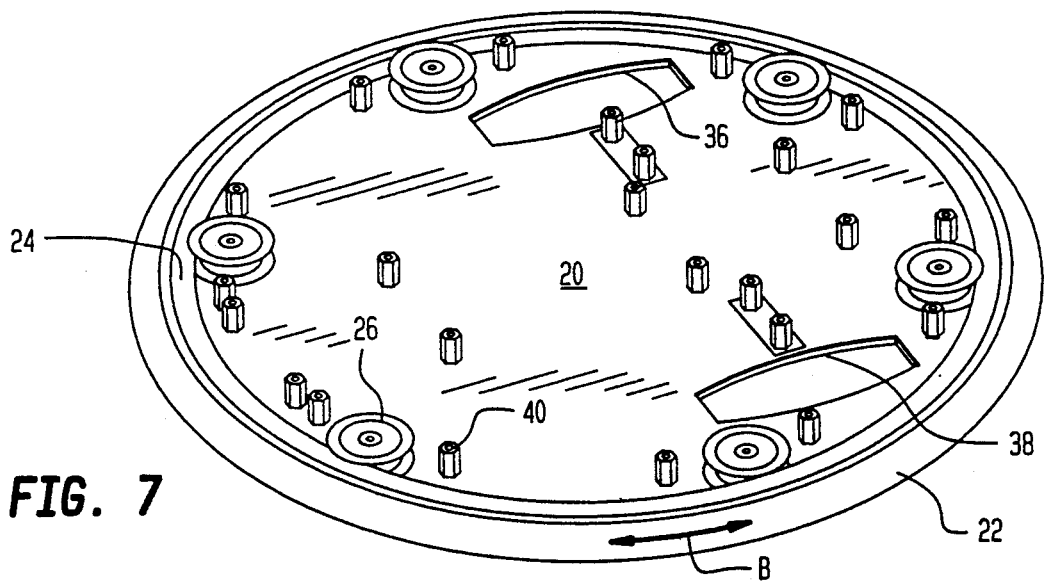
FIG. 7 is a perspective view of the frame shown in FIG. 1 after removal of the mating, spaced upper plate.
Figure 8:
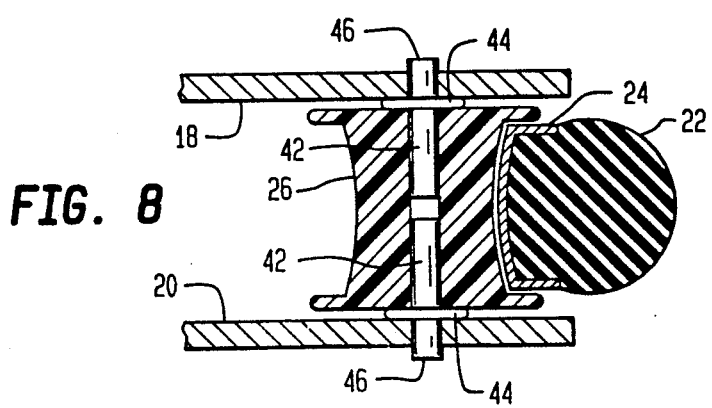
FIG. 8 is a section view in the direction of arrows 8—8 in FIG. 4.

Referring particularly to FIGS. 6 to 8, frame 12 includes two symmetrically spaced apart front wheels 28 positioned forwardly of and somewhat astride the pedestal 110 of seat 16 and supporting a storage battery 104. Frame 12 is cooperatively structured with seat 16 so that a user's feet may comfortably rest atop frame 12 without the need for additional foot support structure. Frame 12 is constructed of two spaced apart circular or disc-shaped plates 18 and 20, both of which include wheel clearance apertures 30/32 and 36/38, respectively. Front wheels 28 are rigidly mounted to frame 12 about axles 104 as best seen in FIG. 3.

Still referring to FIGS. 6 to 8, upper and lower plates 18 and 20, respectively are held spaced apart by a plurality of spacers 40 and threaded fasteners (not shown) therethrough strategically arranged for adequate support over the entire surface of frame 12. This arrangement affords convenient support of battery 104 through aperture 34 so as to rest atop lower plate 20. Also sandwiched between plates 18 and 20 are a plurality of rollers 26 which are mounted concentrically and evenly spaced about the common centers of plates 18 and 20 and slightly inboard of the perimeters thereof. These rollers 26, as best seen in FIG. 8, are rotatably mounted about two part aligned shafts 42 which are held within aligned holes within upper and lower plates 18 and 20 by shaft extensions 46. Flanges 44 properly space each roller 26 sufficiently from upper and lower plates 18 and 20 provide free roller action.

Lockably engaged to surround the circular perimeter defined by the plurality of rollers 26 is a rubber cushioned ring 22 having a metal inner rim 24 which rotatably engages within the rollers 26. By this arrangement, the cushioned ring 22 is free to rotate back and forth in the direction of arrow B around upper and lower discs 18 and 20.

Referring particularly to FIGS. 1 to 4, the detail of the steerable rear wheel assembly 14 is there shown. A downwardly extending yoke 54 rotatably supports rear wheel 82, the yoke being supported for rotation only about axis A within a horizontal support 58. The horizontal support 58 is, in turn, rigidly connected to frame 12 by upright support 114 and plate 112 as shown.

The rear wheel propulsion arrangement includes a motor 70 mounted on plate 71 connected to yoke 54. The output shaft 78 of motor 70 is connected by drive belt 72 to pulley 74. This pulley 74 is also mounted for rotation within plate 71 and having a chain drive gear coaxially disposed on the opposite side of plate 71 which transfers power to chain 80 which is in drivable engagement with sprocket 76 coaxially connected to wheel 82. By this arrangement, actuation of motor 70 in either direction results in the corresponding movement forward or rearwardly of the vehicle.

Still referring to FIGS. 1 to 4, steerable control of the rear wheel assembly 14 includes a small geared motor (not shown except in FIG. 9) mounted beneath plate 84 and in driving relation with output shaft 64 and pulley 66. Pulley 66 drivably engages with drive belt 62 so as to rotate sprocket 60 back and forth in the direction of arrow C in FIG. 4. Sprocket 60, in turn, is connected to steering shaft 56 and yoke 54 as previously described. By this arrangement, controlled back and forth rotation of the motor (not shown) causes rear wheel 82 to move correspondingly back and forth to steer the vehicle 10.

Referring additionally to FIG. 9, an alternate arrangement of the rear steering arrangement is there shown at 14a wherein rear wheel 82 is mounted within yoke 54 as previously described. In this arrangement 14a, the propulsion motor 70 is immediately laterally adjacent and in line with wheel 82 so as to have deleted the chain drive mechanism previously described. Steering motor 116 is operably connected to output shaft 64 on support 58A and is in driving engagement by drive belt 62 with sprocket 60 and steering shaft 64 as previously described.

Referring again to FIGS. 1 to 4, a pair of anti-scuff rollers 48 are connected on either side of frame 12 about symmetric upright axes by plates 50. These anti-scuff rollers 48, as best seen in FIG. 3, prevent the rear steering assembly 14 from contacting a wall surface W (shown in phantom) when the perimeter of either side of frame 12 and one of the anti-scuff wheels 48 are in contact with the wall surface W.

To help prevent excessive tipping of the device 10 during sharp, rapid maneuvers, anti-tip wheels 52 are mounted about horizontal axes beneath each anti-scuff wheel 48 as best seen in FIG. 1. These anti-tip wheels 52 are preferably caster-type wheels, although they may be mounted about fixed axes for rotation only as well. The anti-tip wheels 52 are positioned slightly above the support surface atop which the vehicle is resting in its static position. This clearance between the support surface and anti-tip wheels 52 is provided so that these wheels 52 only come in contact with the support surface when the vehicle 10 begins to lean laterally in one direction or the other. Otherwise, during normal operation, these anti-tip wheels 52 are not in contact with the support surface and do not interfere with maneuverability of the vehicle 10.

Referring now particularly to FIGS. 5 and 9 to 11, the means for controlling the steering and maneuverability of the vehicle 10 is there shown. A control lever 92 in the form of a "joystick" is pivotally mounted about its lower end for pivotal movement at its upper end in all directions within control box 90. This control box 90 is connected in front of one arm rest 88 of seat 16 so that the joystick 92 may be easily accessible to a user seated in the device 10.

The control box 90 includes a right/left potentiometer 94 and a forward/reverse potentiometer 96 connected orthogonally as best seen in FIG. 10. Activation of the joystick 92 separately regulates each of these potentiometers 94 and 96 as will be described below, although both may be activated by diagonal movement of the joystick 92. A separate housing 102 supports an on/off switch 100 and a speed adjustment 98 for limiting the maximum speed adjustment attainable by the vehicle 10.

Propulsion of the vehicle 10 is controlled by the forward/reverse movement of joystick 92 which actuates potentiometer 96 and, in turn, regulates the level and polarity of voltage supplied to drive motor 70 from storage battery 104.

Referring to FIG. 12, the electronic circuit for controlling the steering or rotational position of rear wheel 82 within yoke 54 is there shown. Actuation of the joystick 92 laterally to the right or to the left as shown in FIG. 10 regulates steering potentiometer 94 outlined in phantom in FIG. 12. The positioning of yoke 54 actuates a steering feedback potentiometer 68 which is also outlined in phantom in FIG. 12. Feedback potentiometer 68 is held stationary as by conduit 86 as best seen in FIG. 4. These two potentiometers 94 and 68; having variable resistors R1 and R2 contained therewithin, are employed to provide a command input signal and a steering feedback signal, respectively. The joystick 92 actuates potentiometer 94 to provide a command signal. The positioning of yoke 54 actuates potentiometer 68 to provide feedback signal. If the two signals are in agreement on position, then a null or zero voltage condition will exist at summing junction 120, and no corrective action will be called for of steering motor 116.

However, when the steering potentiometer 94 is shifted to a position to the right by the actuation of joystick 92, the null condition at 120 is disrupted and appropriate rotational action will be called for by steering motor 116. This is accomplished by the combination of resistors R5, R6, R7, R8, and R9 which form a decision making network to generate a desired corrective signal, known in prior art as a "bang" or "window" servo. This window servo will command the steering motor 116 to turn to the right. When the feedback potentiometer 68 senses sufficient corrective turning of yoke 54, a null condition will again occur at junction 120 and the window servo will cease activation of the steering motor 116. When the command potentiometer 94 is activated to the left by joystick 92, a non-null condition occurs at junction 120 and the window servo will output a reverse polarity voltage which will cause the steering motor 116 to rotate in the opposite direction until another null condition has established at junction 120.

Transistors Q1, Q2, Q3, and Q4 are drivers which allow voltage reversal and dynamic breaking of the steering motor 116. To accomplish this dynamic breaking, the transistors Q1 and Q2 are turned on by a high signal from amplifiers U1-1 and U1-2. To turn right, transistors Q3 and Q4 are turned on via a low signal from amplifiers U1-4 and a high signal from amplifier U1-2. To turn left, transistors Q1 and Q2 are turned on by a high signal from amplifier U1-1 and a low signal from amplifier U1-3. This circuit consisting of the four amplifiers within 118 in phantom is known in prior art as an "H" bridge.

In experimentation, applicant has been able to manipulate the device 10 around virtually any 90 degree corner, including passage into doorways along narrow hallways which are only slightly wider than the overall diameter of the frame 12 of vehicle 10. Note that a fixed ring-shaped cushion in lieu of the rotatable cushioned ring 22 will also serve a somewhat similar function. However, if the cushioned ring 22 is non-rotatable, some rubbing and movement between a wall corner or doorway C and the cushioned ring 22 may occur. Additionally, having the cushioned ring 22 rotatable, should the vehicle 10 being driven down a narrow hallway, inadvertently wander off center so as to encounter one wall or the other, rotation of cushion ring 22 occurs to prevent any damage or scuffing of the wall surface.

Because front wheels 28 are inboard of ring 22, and because frame 12 is in close proximity to the ground, the risk of running over a pedestrian's foot as in a crowded hall of a nursing home or shopping mall is significantly reduced.

It is noted that the frame may also be structured of braces or the like rather than plate material, which braces include support elements for each roller as previously described. Likewise, foot supports may be included astride the front wheel.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A self-propelled personal mobility vehicle for transporting a person comprising:
   a generally flat frame supported generally horizontally above the ground by a rear wheel steerable about a generally upright axis and two spaced front wheels;
   said rear wheel positioned along a central longitudinal axis of and rearwardly of said frame;
   first drive means operably connected to said rear wheel for propelling said vehicle;
   second drive means operably connected between said frame and said rear wheel for controlledly rotationally positioning said rear wheel about said upright axis;
   a seat connected to and upwardly extending from said frame;
   control means including a hand-actuated lever supported on said seat for selectively controlling the rotational speed of said first drive means and the rotational steering positioning of said rear wheel by selective activation of said second drive means;
   a stored source of electronic power mounted on said frame and operably connected between said control means and said first and second drive means;
   said frame having a cushioning ring connected around and radially extending from a perimeter of said frame;
   means connected to said frame for supporting and permitting said ring to freely rotate about a common central upright axis of said frame and said ring;
   said front wheels being spaced apart along a common transverse axis and positioned within the perimeter of said frame.

2. A personal mobility vehicle as set forth in claim 1, further comprising:
   a cushioned anti-scuff wheel connected on each side of said frame and held for rotation about an upright axis;
   each said anti-scuff wheel positioned radially outwardly from the perimeter of said frame and rearwardly of the widest transverse dimension of said frame whereby said rear wheel will not contact a straight wall surface when said frame and one said anti-scuff wheel are simultaneously in contact with the wall surface.

3. A personal mobility vehicle as set forth in claim 2, further comprising:
   an anti-tip wheel connected beneath each said anti-scuff wheel, each said anti-tip wheel positioned vertically just above a support surface of said vehicle whereby one said anti-tip wheel will contact the support surface when said frame is tilted laterally from an at-rest generally horizontal position above the support surface.

4. A self-propelled personal mobility vehicle for transporting a person comprising:
   a circular frame including two rigidly connected spaced apart discs, said frame supported generally horizontally in close proximity above the ground by a steerable rear wheel and two spaced apart front wheels, said rear wheel including a first drive means for propelling said vehicle;
   said rear wheel positioned centrally along a longitudinal axis of said frame and operably connected to, and in close proximity rearwardly of, said frame about an upright steering axis;
   a seat connected to and upwardly extending from said frame, said seat positioned fore-and-aft with respect to said frame whereby the person's feet may rest atop said frame;
   a cushioning ring roller mounted between said discs for free rotation about a central upright axis of said frame;
   said ring radially outwardly extending beyond said discs;
   control means including a hand-actuated control lever supported on said seat for selectively controlling the rotational speed of said first drive means and the rotational steering positioning of said rear wheel about said steering axis by selective activation of a second drive means operably connected between said rear wheel and said frame;
   a storage battery supported on said frame and operably connected between said control means and said first and second drive means;
   said front wheels being spaced apart along a common transverse axis and positioned within the perimeter of said frame.

5. A personal mobility vehicle as set forth in claim 4, further comprising:
   a cushioned anti-scuff wheel connected on each side of said frame and held for rotation about an upright axis;
   each said anti-scuff wheel positioned radially outwardly from the perimeter of said frame and rearwardly of the widest transverse dimension of said frame whereby said rear wheel will not contact a straight wall surface when said frame and one said anti-scuff wheel are simultaneously in contact with the wall surface.

6. A personal mobility vehicle as set forth in claim 5, further comprising:
   an anti-tip wheel connected beneath each said anti-scuff wheel, each said anti-tip wheel positioned vertically just above a support surface of said vehicle whereby one said anti-tip wheel will contact the support surface when said frame is tilted laterally from an at-rest generally horizontal position above the support surface.

7. A self-supported personal mobility vehicle for transporting a person comprising:
   frame means supported above the ground by a steerable motor driven rear wheel positioned behind said frame means and two spaced apart front wheels for supporting the person in a seat connected to and upwardly extending from said frame means;
   first drive means operably connected to said rear wheel for propelling said vehicle;
   second drive means operably connected between said frame and said rear wheel for controlledly rotationally positioning said rear wheel about said upright axis;
   cushioning ring means mounted on said frame means for free rotation and extending radially in all horizontal directions from the perimeter of said frame means for contacting fixed objects such as walls and doorways so as to guide said vehicle along a hallway or through a doorway;
   control means including a hand-actuated lever supported on said seat for selectively controlling the rotational speed of said first drive means and the rotational steering positioning of said rear wheel by selective activation of said second drive means;
   battery means operably connected between said control means and said first and second drive means;
   said front wheels being spaced apart along a common transverse axis and positioned within the perimeter of said frame.

8. A personal mobility vehicle as set forth in claim 7, further comprising:
   a cushioned anti-scuff wheel connected on each side of said frame and held for rotation about an upright axis;
   each said anti-scuff wheel positioned radially outwardly from the perimeter of said frame and rearwardly of the widest transverse dimension of said frame whereby said rear wheel will not contact a straight wall surface when said frame and one said anti-scuff wheel are simultaneously in contact with the wall surface.

9. A personal mobility vehicle as set forth in claim 8, further comprising:
   an anti-tip wheel connected beneath each said anti-scuff wheel, each said anti-tip wheel positioned vertically just above a support surface of said vehicle whereby one said anti-tip wheel will contact the support surface when said frame is tilted laterally from an at-rest generally horizontal position above the support surface.

* * * * *